United States Patent
Shah et al.

(10) Patent No.: US 11,238,679 B2
(45) Date of Patent: Feb. 1, 2022

(54) AUTOMATED PHYSICAL PACKAGE DELIVERY WITH END-TO-END PACKAGE SECURITY

(71) Applicant: DISH Network L.L.C., Englewood, CO (US)

(72) Inventors: Rima Shah, Broomfield, CO (US); Swapnil Tilaye, Thornton, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/147,922

(22) Filed: Jan. 13, 2021

(65) Prior Publication Data

US 2021/0134094 A1    May 6, 2021

Related U.S. Application Data

(63) Continuation of application No. 17/009,378, filed on Sep. 1, 2020, now Pat. No. 10,909,786, which is a continuation of application No. 16/268,308, filed on Feb. 5, 2019, now Pat. No. 10,796,512.

(51) Int. Cl.
| | |
|---|---|
| G07C 9/00 | (2020.01) |
| H04L 9/08 | (2006.01) |
| H04L 29/06 | (2006.01) |
| G06Q 50/28 | (2012.01) |
| G07C 9/27 | (2020.01) |
| G07C 9/38 | (2020.01) |

(52) U.S. Cl.
CPC ......... *G07C 9/00309* (2013.01); *G06Q 50/28* (2013.01); *G07C 9/00896* (2013.01); *G07C 9/27* (2020.01); *G07C 9/38* (2020.01); *H04L 9/0825* (2013.01); *H04L 9/0866* (2013.01); *H04L 9/0897* (2013.01); *H04L 63/0428* (2013.01); *H04L 63/08* (2013.01); *G07C 2009/00412* (2013.01)

(58) Field of Classification Search
CPC ....................................................... G07C 9/00
See application file for complete search history.

(56) References Cited

U.S. PATENT DOCUMENTS

| | | |
|---|---|---|
| 8,068,023 B2 | 11/2011 | Dulin et al. |
| 8,108,321 B2 | 1/2012 | Neal et al. |
| 8,279,067 B2 | 10/2012 | Berger et al. |

(Continued)

OTHER PUBLICATIONS

"Box Lock", Available Online at: https://www.getboxlock.com/, Accessed From Internet on Jun. 17, 2019, 3 pages.

*Primary Examiner* — K. Wong
(74) *Attorney, Agent, or Firm* — Kilpatrick Townsend & Stockton LLP

(57) ABSTRACT

Novel techniques are described for automated physical package delivery with end-to-end package security. For example, a sender can secure contents of a physical package using an electronic lock locked using a lock code. The lock code is encrypted by applying an encryption key to generate an encrypted lock code. The encryption key is generated in accordance with a decryption key associated with the recipient, such that application of the decryption key by the recipient to the encrypted lock code can generate an unlock code to unlock the electronic lock. An intermediary automated package delivery system can provide one or more end-to-end security features, including facilitating key exchange features between the sender and recipient, applying additional sensor tag features, and directing autonomous delivery features.

20 Claims, 6 Drawing Sheets

(56) References Cited

U.S. PATENT DOCUMENTS

| | | | |
|---|---|---|---|
| 8,948,935 | B1 | 2/2015 | Peeters et al. |
| 9,359,074 | B2 | 6/2016 | Ganesh et al. |
| 9,489,490 | B1 | 11/2016 | Theobald |
| 9,618,931 | B2 | 4/2017 | Zini et al. |
| 9,741,010 | B1 | 8/2017 | Heinla |
| 9,833,097 | B2 | 12/2017 | Byers et al. |
| 9,852,567 | B2 | 12/2017 | Hild et al. |
| 10,303,171 | B1 | 5/2019 | Brady et al. |
| 10,796,512 | B2 | 10/2020 | Shah et al. |
| 10,909,786 | B2 | 2/2021 | Shah et al. |
| 2017/0286905 | A1 | 10/2017 | Richardson et al. |
| 2018/0130017 | A1 | 5/2018 | Gupte |
| 2018/0191889 | A1 | 7/2018 | Gerhardt et al. |
| 2020/0250908 | A1 | 8/2020 | Shah et al. |

AUTOMATED PHYSICAL PACKAGE DELIVERY WITH END-TO-END PACKAGE SECURITY

CROSS-REFERENCES TO RELATED APPLICATIONS

This application is a continuation of U.S. patent application Ser. No. 17/009,378, filed Sep. 1, 2020, entitled "Automated Physical Package Delivery With End-To-End Package Security," which application is a continuation of U.S. patent application Ser. No. 16/268,308, filed on Feb. 5, 2019, entitled "Automated Physical Package Delivery With End-To-End Package Security," now U.S. Pat. No. 10,796,512, issued Oct. 6, 2020, the disclosures of which are hereby incorporated by reference in their entirety for all purposes.

FIELD

This invention relates generally to physical package delivery, and, more particularly, to systems and methods for combining logical and physical security over communication and delivery networks to secure delivery of physical packages from senders to recipients via distribution centers.

BACKGROUND

Delivery of packages from a sender to a recipient typically involves a number of stages, each introducing multiple opportunities for error, inefficiency, tampering, and/or other concerns. For example, the sender may incorrectly associate delivery information with a package, may improperly and/or insufficiently secure the package for transit, etc.; and at a distribution facility, the package may be lost, tampered with, incorrectly routed, and/or otherwise mismanaged. When delivered, the intended recipient of a package may not be at the shipping destination precisely when the package is delivered. This can leave the package vulnerable to being accepted by an unintended recipient, stolen, tampered with, damaged, or otherwise unsuccessfully delivered.

Current package delivery services tend not to provide efficient and effective approaches for ensuring end-to-end security (i.e., from the sender to the recipient). Over the years, many approaches have been implemented to automate various stages of package delivery services, seeking to improve efficiency and reliability. Recently, some such approaches have suggested using drones (autonomous vehicles) to bring packages to and from distribution facilities. Use of drones can increase efficiency in certain ways, such as by reducing the need for human drivers. However, drone-based approaches can be prone to many of the same concerns as those of traditional approaches, as well as additional concerns. For example, with many such approaches, a package left at a delivery location by a drone can still be tampered with or stolen; an unauthorized individual can tamper with or damage a delivery drone to gain unauthorized access to a package; a package can be damaged or destroyed if a delivery drone crashes; etc.

BRIEF SUMMARY

Among other things, embodiments provide novel systems and methods for automated physical package delivery with end-to-end package security. For example, a sender can secure contents of a physical package using an electronic lock locked using a lock code. The lock code is encrypted by applying an encryption key to generate an encrypted lock code. The encryption key is generated in accordance with a decryption key associated with the recipient, such that application of the decryption key by the recipient to the encrypted lock code can generate an unlock code to unlock the electronic lock. An intermediary automated package delivery system can provide one or more end-to-end security features, including facilitating key exchange features between the sender and recipient, applying additional sensor tag features, and directing autonomous delivery features.

According to one set of embodiments, a method is provided for physical package delivery from a sender to a recipient with end-to-end security. The method includes: receiving a physical package at a distribution facility from the sender remote from the distribution facility, the physical package having a unique package identifier and having contents secured by an electronic lock that is locked by the sender prior to the receiving using a lock code encrypted by an encryption key to generate an encrypted lock code, the encryption key being generated in accordance with a decryption key of the recipient, such that the decryption key is usable to decrypt the encrypted lock code to unlock the electronic lock; scanning the physical package at the distribution facility, using a scanner, to obtain the unique package identifier from the physical package, the unique package identifier associated with delivery information and with the encryption key prior to the receiving, the delivery information indicating a physical recipient destination and a logical recipient destination; obtaining the delivery information and the encrypted lock code automatically in response to the scanning and in accordance with the unique package identifier; physically routing the physical package from the distribution facility to the physical recipient destination responsive to the obtaining; and communicating the encrypted lock code to the logical recipient destination responsive to the obtaining.

According to another set of embodiments, an automated package delivery system is provided with end-to-end package security. The system includes: a network interface to communicatively couple with one or more communications networks; a scanner interface; one or more processors; and a memory communicatively coupled with, and readable by, the one or more processors and having stored therein processor-readable instructions. When the instructions are executed by the one or more processors, they cause the one or more processors to: receive scan data from a scanner via the scanner interface responsive to scanning a physical package to obtain a unique package identifier from the physical package, the unique package identifier associated with delivery information and with an encryption key, the delivery information indicating a physical recipient destination and a logical recipient destination, the physical package received at a distribution facility from a sender remote from the distribution facility, the physical package having the unique package identifier and having contents secured by an electronic lock that is locked by the sender using a lock code encrypted by the encryption key to generate an encrypted lock code, the encryption key generated in accordance with a decryption key of a recipient of the physical package, such that the decryption key is usable to decrypt the encrypted lock code to unlock the electronic lock; obtain the delivery information and the encrypted lock code automatically in response to receiving the scan data and in accordance with the unique package identifier; direct physical routing of the physical package from the distribution facility to the physical recipient destination; and communicate the encrypted lock code to the logical recipient destination over the one or more communications networks via the network interface.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Current physical package delivery services tend not to provide efficient and effective approaches for ensuring end-to-end security (i.e., from the sender to the recipient). Over the years, many approaches have been implemented to automate various stages of package delivery services, seeking to improve efficiency and reliability. Recently, some such approaches have suggested using drones (autonomous vehicles) to bring packages to and from distribution facilities. Use of drones can increase efficiency in certain ways, such as by reducing the need for human drivers. However, drone-based approaches can be prone to many of the same concerns as those of traditional approaches, as well as additional concerns. For example, with many such approaches, a package left at a delivery location by a drone can still be tampered with or stolen; an unauthorized individual can tamper with or damage a delivery drone to gain unauthorized access to a package; a package can be damaged or destroyed if a delivery drone crashes; etc. Among other things, embodiments described herein include novel approaches for providing end-to-end security for physical package delivery.

Figure 1:
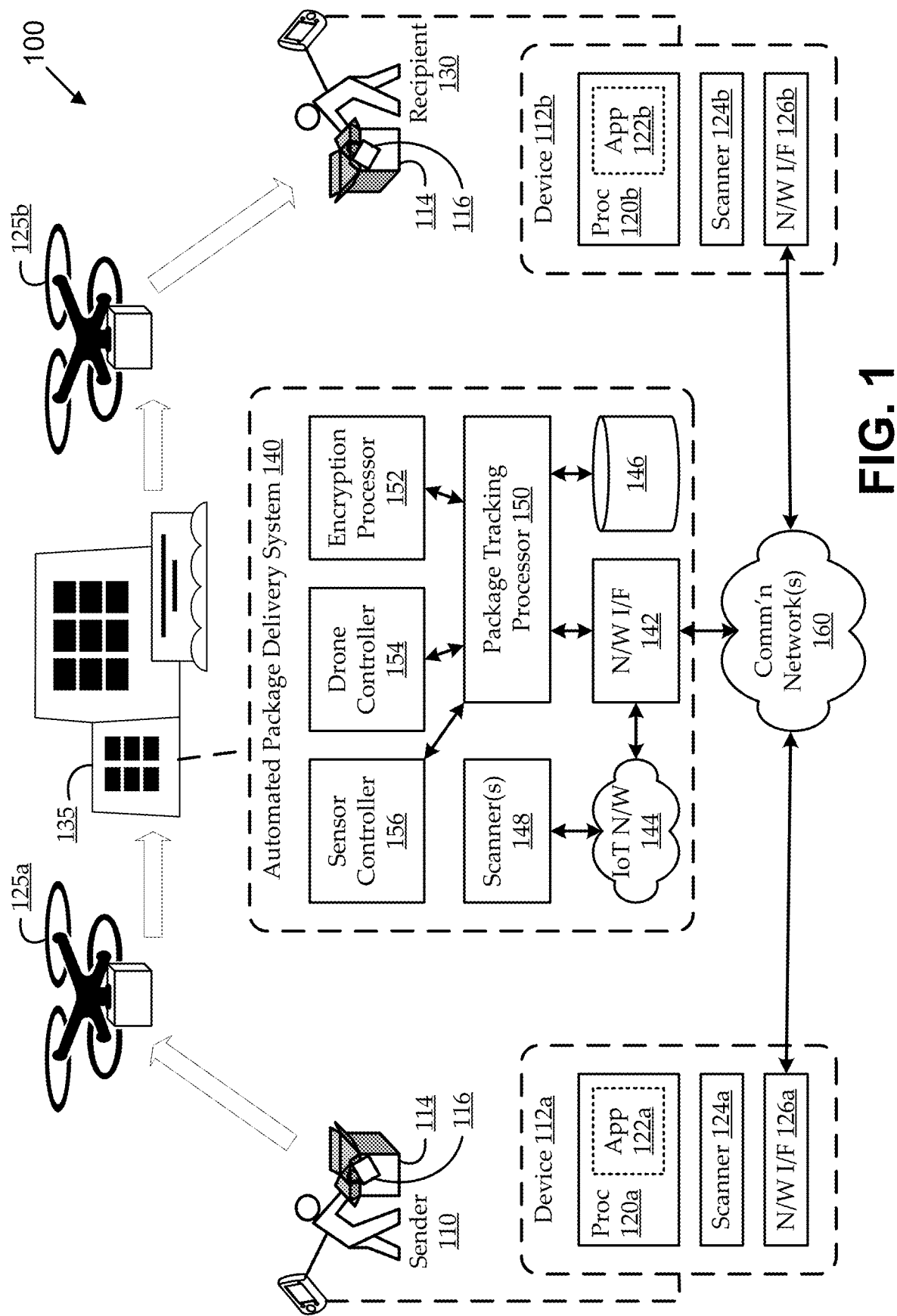
FIG. 1 shows an embodiment of a physical package delivery environment, according to various embodiments.

FIG. 1 shows an embodiment of a physical package delivery environment 100, according to various embodiments. The physical package delivery environment 100 can include an automated package delivery system 140 that acts as an intermediary between senders 110 and recipients 130. In general, FIG. 1 assumes that a sender 110 desires to deliver a physical package 114 to a recipient 130, and the delivery passes through a distribution facility 135, where the delivery is facilitated by the automated package delivery system 140 disposed in the distribution facility 135. Typically, such an environment 100 facilitates physical package delivery between a large number of senders 110 and a large number of recipients 130, though only one of each is shown to avoid overcomplicating the illustration. Further, such an environment may include multiple automated package delivery systems 140 distributed over one or more distribution facilities 135 in one or more geographic locations, though only a single automated package delivery system 140 is shown to avoid overcomplicating the illustration.

When the sender 110 desires to send the physical package 114, it is assumed that the sender 110 desires end-to-end security. To that end, the sender 110 can secure the contents of the physical package 114 using an electronic lock 116. The physical package 114 can be any type of physical package that is suitable for securing its contents using an electronic lock 116, such as lockable box, crate, envelope, bag, etc. In some embodiments, the physical package 114 comprises features that adapt the package for use with drone delivery. For example, the physical package 114 can include structural features that support automated grabbing, picking, lifting, moving, turning, dropping, placing, etc. by a delivery drone 125. The physical package 114 can interface with the electronic lock 116 in any suitable manner. In some implementations, the electronic lock 116 is separate (or separable) from the physical package 114, and the physical package 114 includes one or more structural features (e.g., holes, slots, etc.) with which the electronic lock 116 can interface to secure the contents of the physical package 114. In other implementations, the electronic lock 116 is integrated with the physical package 114 (e.g., the physical package 114 includes a locking enclosure that includes an electronic interface, and the locking enclosure and electronic interface make up the electronic lock 116).

The electronic lock 116 can include any suitable locking mechanism (e.g., a physical lock, including bolts, tumblers, etc.) that is electronically controllable. In some implementations, the electronic lock 116 includes a human interface. As one example, the electronic lock 116 includes a screen, keypad, or the like, that facilitates entry of (e.g., and/or display of) an electronic code for locking and/or unlocking the electronic lock 116. As another example, the electronic lock 116 includes a biometric reader, such as a thumbprint scanner, or the like, that is associated with a key code for the electronic lock 116. In other implementations, the electronic lock 116 includes one or more computational interfaces, such as one or more wired and/or wireless portions. As one example, the electronic lock 116 can be locked and/or unlocked by inserting a digital key into a port (e.g., a digital key code is stored on a universal serial bus (USB) device, which can be inserted into a USB port). As another example, the electronic lock 116 can be locked and/or unlocked by placing an electronic device (e.g., a smart phone) in contact, or in proximity, with the electronic lock 116 (e.g., such that a key code can be transmitted to the electronic lock 116 using Bluetooth, near field communication (NFC), RFID, WiFi, or another short-range or contact-based communications scheme).

As described herein, the physical package 114 and/or the electronic lock 116 can include additional features to facilitate end-to-end security, as described herein. In some embodiments, such features include features that facilitate physical securing of the package by the delivery drone 125, such as physical features that enable to delivery drone 125 to securely hold on to the physical package 114 until a recipient 130 is authorized (e.g., and only then to physically release the physical package 114). In some embodiments, such features include one or more labels including one or more types of identifiers; or regions if the physical package 114 adapted to receive such labels. The labels can be adapted to be read by various types of readers. For example, some such labels can include human-readable information (e.g., printed alphanumeric characters), which may also be readable by automated systems (e.g., using optical character recognition, or the like). Other such labels can include data encoded into a radiofrequency identification (RFID) tag, a barcode, a multidimensional barcode (e.g., a matrix code, a quick response (QR) code, etc.), a magnetic code (e.g., printed in magnetic ink, responsive to a magnetic signature, etc.), an optical code (e.g., holographic, responsive to a particular optical signature, etc.), and/or any other suitable labels. The labels can be applied to the physical package 114 (e.g., by the sender 110, at the distribution facility 135, etc.) in any suitable manner (e.g., by using adhesive, or any other suitable chemical or mechanical fastener; by inserting the label into an envelope, slot, or other receiving portion of the physical package 114; etc.), and/or integrated with the physical package 114 (e.g., the physical package 114 has one or more of the labels built into the physical package 114).

Embodiments assume that the physical package 114 is associated with at least one unique package identifier. As used herein, a "unique" identifier generally includes any identifier that is unique enough to support the end-to-end security techniques described herein. For example, an identifier can be considered herein as unique, even though it is reused across multiple physical packages 114, so long as the reuse is sufficiently infrequent, unpredictable, and/or otherwise distinguishable (e.g., by geography, by package type, by combination with other identifiers, etc.) to support a desired level of end-to-end security. In some implementations, the unique package identifier is indicated by a label of the physical package 114. In other implementations, the unique package identifier is indicated by a label of the electronic lock 116. In other implementations, the unique package identifier is indicated by a combination of multiple identifiers, and/or is repeated in multiple locations, such as on one or more labels of the physical package 114 and the electronic lock 116.

As illustrated, the sender 110 and the recipient 130 can each be associated with a respective device 112 (i.e., the sender 110 with a sender device 112a, and the recipient 130 with a recipient device 112b). Each device 112 can be implemented any suitable computational device, such as a smart phone, tablet computer, laptop computer, etc. Embodiments of the devices 112 can include a processor 120 and a network interface 126. The network interface 126 of each device 112 can facilitate communications between the device 112 and one or more other devices 112, and/or between the device 112 and one or more automated package delivery systems 140. Such communications can be over any suitable communications network (or networks) 160. For example, the communications network(s) 160 can include cellular network links, fiber-optic network links, cable network links, satellite network links, wide- and/or narrow-band network links, wired and/or wireless network links, public and/or private network links, etc. In one implementation, the communications network(s) 160 include the Internet. In some implementations, the devices 112 also include one or more types of scanner 124 (e.g., to interface with one or more types of electronic lock 116, label, etc., as described herein).

In some embodiments, the processor 120 of each device 112 is configured to run one or more applications 122 to facilitate features described herein. In some implementations, the applications 122 include a dedicated package delivery application. The package delivery application can include a sender application interface and a recipient application interface, and, in some cases, a distribution facility interface. The application(s) 122 can be implemented as a local application of the device 112, as a portal to a remotely hosted application, as a thin client application, and/or in any suitable manner. In some embodiments, the application(s) 122 include processor-implemented code, received by and/or stored on the device 112, which are executable by the processor 120 of the device 112 to implement features described herein.

When the sender 110 is ready to send the physical package 114, the sender 110 can place the desired contents into the physical package 114, and secure the physical package 114 using the electronic lock 116. The electronic lock 116 can be locked using a lock code, which can be encrypted according to an encryption key to generate an encrypted lock code. The encryption key can be generated in accordance with a decryption key of the recipient 130, such that the decryption key is usable by the recipient 130 to decrypt the encrypted lock code to unlock the electronic lock 116 (e.g., when the physical package is received by the recipient). The exchange of keys, and related features, can be implemented in various ways. Some of those ways are illustrated in FIGS. 2A-2D, below.

Embodiments assume that the sender 110 and the recipient 130 are both remote from the distribution facility 135, and that delivery of a physical package 114 from the sender 110 to the recipient 130 passes through the distribution facility 135. For example, the physical package 114 can be delivered to the distribution facility 135 using autonomous vehicles, non-autonomous vehicles, semi-autonomous vehicles, etc. In association with the physical package 114 passing through the distribution facility 135, the physical package 114 is processed by the automated package delivery system 140. Further, as described herein, when the physical package 114 is received by components of the automated package delivery system 140, the physical package 114 has a unique package identifier associated therewith (e.g., affixed to, integrated with, or otherwise physically associated with the physical package 114 and/or the electronic lock 116). Embodiments of the automated package delivery system 140 can process the physical package 114 to facilitate features associated with the physical package 114 deliver using various components, which may be collocated, distributed, etc. The components of the automated package delivery system 140 can include some or all of a network interface 142, a data store 146, a package tracking processor 150, an encryption processor 152, a drone controller 154, a sensor controller 156. In some embodiments, the automated package delivery system 140 further includes (and/or interfaces with) one or more scanners 148. The scanners 148 can be in communication with other components of the automated package delivery system 140 via a local communications network.

In one implementation, the scanners 148 are Internet of Things (IoT) devices that communicate with the network interface 142 via a low power, narrow-band, IoT network 144. The IoT network 144 can include any suitable network for enabling communications with and/or between the IoT devices, including one or more public and/or private network links that are wired and/or wireless, such as a narrow-band Internet of Things (NB-IoT) network, a low-power wide area network (LPWAN), a long-range wide area networks (LoRaWANs), a cellular IoT network (e.g., Long Term Evolution (LTE), LTE 4G category M (LTE CAT-M), 5G, etc.); and/or networks relying on Near Field Communication (NFC), Bluetooth, Zigbee, IEEE 802.11 (WiFi), and/or other protocols and related components.

When the physical package 114 is received, it can be scanned by the one or more scanners 148. For example, the scanners 148 can include any suitable scanning technology for obtaining the unique package identifier from the physical package 114. In some embodiments, the unique package identifier is uniquely associated with the electronic lock 116 (e.g., applied to the lock, integrated with the lock, etc.), and the scanners 148 can scan the electronic lock 116 to obtain the unique package identifier. In other embodiments, the unique package identifier is uniquely associated with a label of the physical package 114 (e.g., applied to the physical package 114, integrated with the physical package 114, etc.), and the scanners 148 can scan the label to obtain the unique package identifier. The unique package identifier can be associated with delivery information and with the encryption key prior to the receiving. For example, the sender 110 can have transmitted information to the distribution facility that includes the unique package identifier and the delivery information, and, in some cases, the encryption key and/or the encrypted lock code (e.g., as described more fully below). The delivery information can indicate a physical recipient destination (e.g., a street address) and a logical recipient destination (e.g., a logical identifier of the recipient in a database; a network identifier or locator for a device or application of the recipient; a phone number, email address, or other communication identifier; etc.). In general, the physical recipient destination indicates how the physical package 114 will be physically routed for physical receipt by the recipient 130 to facilitate physical package 114 delivery; and the logical recipient destination indicates how certain logical information will be logically routed for logical receipt by the recipient 130 to facilitate end-to-end security of the physical package 114 contents.

The obtained unique package identifier can be used automatically to obtain the delivery information and the encrypted lock code. In some embodiments, the scanners 148 are in communication with the package tracking processor 150. For example, the scanners 148 are communicatively coupled with the network interface 142 via the IoT network 144, and the package tracking processor 150 is also coupled with the network interface 142. The package tracking processor 150 can also include, or be in communication with the data store 146, which can have various types of data stored thereon. In some embodiments, the data store 146 is configured to store various types of information in association with the unique package identifier, such as the delivery information and the encrypted lock code for the particular physical package 114 associated with the unique package identifier. In other embodiments, the data store 146 can also store information, such as encryption and/or decryption keys, account information of senders 110 and/or receivers 130, etc.

Embodiments of the package tracking processor 150 can also be coupled with one or more of the encryption processor 152, the drone controller 154, and the sensor controller 156. Embodiments of the encryption processor 152 can handle various key transactions between the senders 110 and recipients 130 in different ways to facilitate end-to-end security of the physical packages 114. Examples of such exchanges are described below with reference to FIGS. 2A-2D. Embodiments of the sensor controller 156 can facilitate applying one or more additional identifiers to the physical package 114 for added security, or to facilitate additional features, prior to physically routing the physical package 114. In some implementations, a sensor tag is applied to the physical package 114. The sensor tag can be an RFID tag, a barcode, a QR code, a magnetic tag, an optical tag, and/or any other suitable tag to apply an associated sensor tag identifier to the physical package 114. The sensor tag identifier can be generated independent of other information relating to the physical package 114, or in accordance with (e.g., as a function of) other information relating to the physical package 114. For example, the sensor tag identifier can be generated as a function of the type of package, sender and/or recipient information, etc.

Having prepared the physical package 114 for physical delivery, embodiments can physically route the physical package 114 from the distribution facility 135 to the physical recipient destination. In support of such physical routing, embodiments of the package tracking processor 150 can schedule, direct, track, and/or otherwise interface with operation of one or more delivery vehicles. In some implementations, the physical routing can involve the package tracking processor 150 scheduling and/or directing any suitable delivery vehicle, including a manual vehicle (e.g., a human-operated delivery truck), a fully autonomous delivery vehicle (e.g., a drone, an autonomous delivery van, etc.), a partially automated vehicle, and/or multiple such vehicles. For example, the physical routing can involve scheduling delivery of the package by an autonomous fork lift to loading dock, where the package is transported by a human-operated delivery van to an airfield, where the package is picked up by an autonomous drone than flies the package to the physical recipient destination. In case of full or partial delivery by autonomous vehicles, the drone controller 154 can work with the package tracking processor 150 to determine which such vehicles to send, can direct scheduling of such vehicles, can manage such vehicles, and/or provide any other features to facilitate use of delivery drones.

Turning briefly to FIGS. 2A-2D, various illustrative key exchange flows 200 are shown, according to various embodiments. The various key exchange flows 200 can involve the sender device 112a, the recipient device 112b, and the automated package delivery system 140. While the automated package delivery system 140 is illustrated as the distribution facility 135 building, it is noted that some or all of the automated package delivery system 140 can be in any suitable location. Each flow 200 can begin by sender 110 (via the sender device 112a) initiating a package delivery request 210 by sending a corresponding message (e.g., via the application 122) to the automated package delivery system 140 (e.g., over the communications network(s) 160). In some implementations, the package delivery request 210 is simply a message that opens a request ticket in a logging system and results in the automated package delivery system 140 generating and associating a package delivery identification number (e.g., for tracking purposes). In other implementations, the package delivery request 210 includes additional information about the package delivery transaction, such as data associated with the sender 110 or the sender device 112a (e.g., the sender's name, address, contact information, login information, account information, payment information, etc.), data associated with the recipient 130 or the recipient device 112b (e.g., the recipient's name, address contact information, etc.), data relating to the physical package 114 delivery (e.g., originating address, destination address, package type, estimated package weight, delivery priority, special delivery instructions, etc.), and/or any other suitable information. A key exchange begins responsive to the package delivery request 210, which can involve the exchange of one or more sender keys 216 and one or more recipient keys 214, in accordance with different flows 200.

Figure 2A:
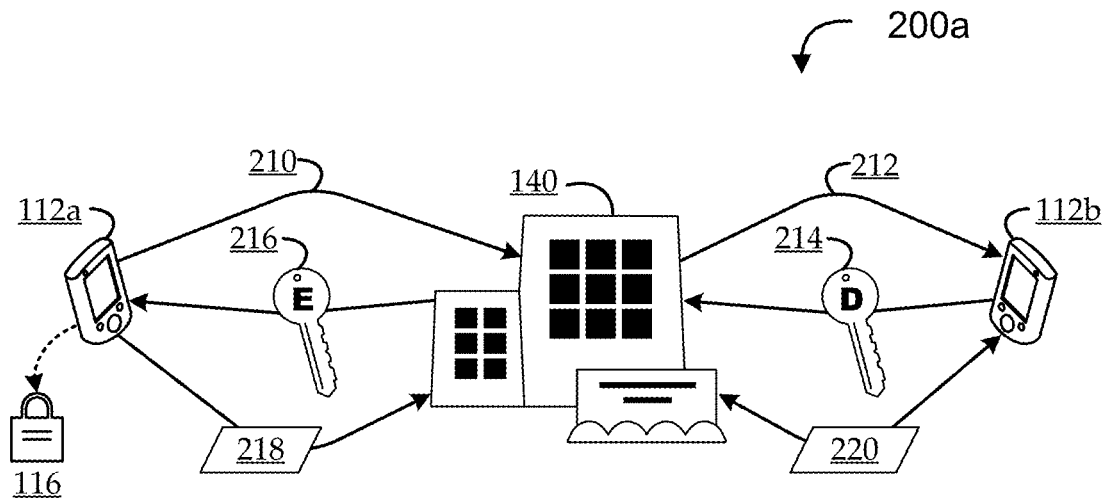
FIGS. 2A-2D shows various illustrative key exchange flows, according to various embodiments.

Turning first to FIG. 2A, a first key exchange flow 200a is shown. Responsive to receiving the package delivery request 210, the automated package delivery system 140 can send a key request message 212 to the recipient device 112b. In response to the key request message 212, the recipient device 212b can communicate a decryption key 214. In some embodiments, the recipient device 212b (e.g., the application 122) operates to store a public recipient key and a private recipient key, generated as asymmetric keys to facilitate public key encryption. In such embodiments, the decryption key 214 can be the public recipient key. In other embodiments, the recipient device 212b (e.g., the application 122) operates to store only a single key, or generates a key in response to receiving the key request message 212, such that the key can act as a symmetric key (or can be used by downstream receiver of the key to generate another key); and that key is the decryption key 214 communicated back to the automated package delivery system 140.

The automated package delivery system 140 can then communicate an encryption key 216 to the sender device 112a. In embodiments that use public key encryption, or the like, the automated package delivery system 140 may simply forward the decryption key 214 to the sender device 112a as the encryption key 216 (i.e., the encryption key 216 is the public recipient key). In some other embodiments, the automated package delivery system 140 may still forward the decryption key 214 to the sender device 112a as the encryption key 216, for example, where it is determined that sufficient end-to-end security is provided even when the key is passed from recipient 130 to sender 110 over the communications network(s) 160 via the automated package delivery system 140. In some such embodiments, the network itself may be secure (e.g., by establishing a secure tunnel, encrypted communications, etc.), such that the key is otherwise secured in transit. In some other embodiments, the automated package delivery system 140 may generate the encryption key 216 from the decryption key 214, prior to communicating the encryption key 216 to the sender device 112a. In some such embodiments, the automated package delivery system 140 generates the encryption key 216 without relation to particulars of the package delivery transaction, for example based on a random key generator, a look up table, etc. In other such embodiments, the automated package delivery system 140 can use information about the package transaction (e.g., timestamp, sender data, recipient data, unique package identifier, etc.) to generate the encryption key 216. For example, a cryptographic hash function can be applied to one or more pieces of information about the package transaction to generate the encryption key 216, and/or such a cryptographic has function can be applied to the decryption key 214 to generate the encryption key 216.

Having received the encryption key 216, the sender device 112a can use the encryption key 216 to generate an encrypted lock code 218. In some embodiments, the sender 110 can choose a lock code for the electronic lock 116 (e.g., a numeric code, an alphanumeric code, a passphrase, a biometric signature, etc.), and the application 122 on the sender device 112a can apply the encryption key 216 to the lock code to generate the encrypted lock code 218. In other embodiments, the encrypted lock code 218 can be generated from the encryption key 216. As one implementation, after the sender device 112a receives the encryption key 216 from the automated package delivery system 140, the sender device 112a can send (e.g., via a wired or wireless connection) a locking instruction to the electronic lock 116, thereby locking the electronic lock 116 in accordance with a lock code generated in accordance with the encryption key 216. In such an implementation, the human sender 110 may never know the lock code. The sender device 112a can then send the encrypted lock code 218 to the automated package delivery system 140. In some embodiments, additional information is sent from the sender device 112a to the automated package delivery system 140 in association with the encrypted lock code 218. For example, in some implementations, the package delivery request 210 is simply initiates the key request. In such implementations, other package delivery information (e.g., scheduling the delivery, originating address, destination address, etc.) may be communicated after the key exchange, such as along with, or after, sending the encrypted lock code 218.

Before or after the physical package 114 is ultimately delivered to the recipient 130, the recipient device 212b can exchange additional information with the automated package delivery system 140 (illustrated as communications 220). In some embodiments, the automated package delivery system 140 notifies the recipient device 212b of the package delivery (e.g., before and/or after the delivery occurs) and pushes the encrypted lock code 218 to the recipient device 212b. In other embodiments, upon receipt of the physical package 114, the recipient 130 uses the recipient device 212b to request the encrypted lock code 218 from the automated package delivery system 140, and to receive the encrypted lock code 218 in response thereto. In some embodiments, in addition to receiving and/or requesting the encrypted lock code 218, the recipient device 212b and the automated package delivery system 140 can exchange additional information. For example, as described herein, in some implementations, the automated package delivery system 140 applies one or more additional security measures to the physical package 114 (e.g., a sensor tag, one or more codes for releasing the package from a delivery drone or delivery drop location), and information relating to those additional measures is exchanged. The recipient device 212b can then apply its known decryption key 214 to the encrypted lock code 218 to generate an unlock code for unlocking the electronic lock 116. In some implementations, the unlock code is the lock code (e.g., applying the decryption key 214 to the encrypted lock code 218 recovers the lock code). In other implementations, the electronic lock 116 is configured so that the lock and unlock codes are different, and the encrypted lock code 218 is generated in such a way that applying the decryption key 214 to the encrypted lock code 218 generates the different unlock code. In other embodiments, the automated package delivery system 140 can inject additional modifications. For example, since the automated package delivery system 140 knows both the encryption key 216 and the decryption key 214, the automated package delivery system 140 can decrypt the encrypted lock code 218, unlock the electronic lock 116, re-lock the electronic lock 116 to generate a new encrypted lock code 218 using the decryption key 214, and send the new encrypted lock code to the recipient device 212b.

Figure 2B:
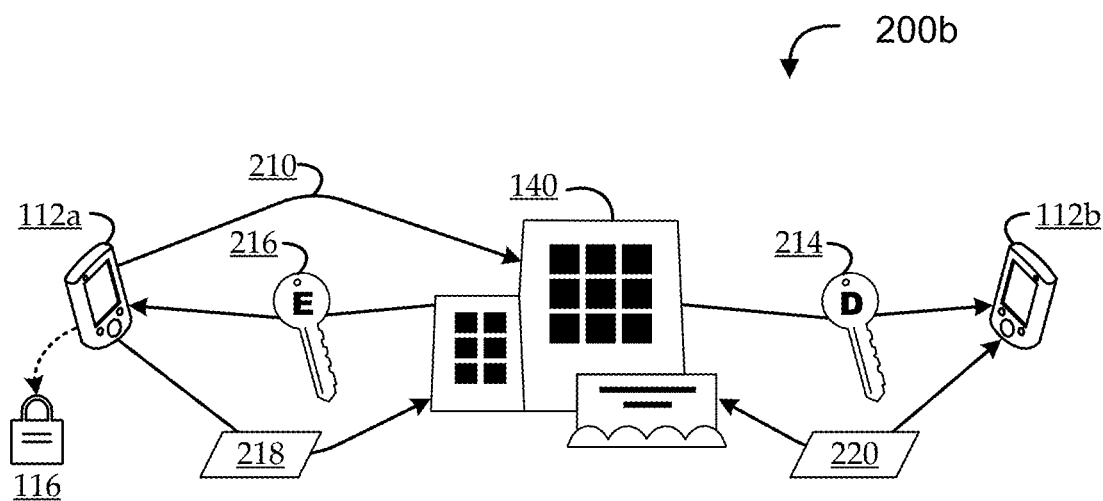

Turning to FIG. 2B, another illustrative flow 200b is shown. In general, the flow 200b can proceed in a similar manner to the flow 200a described above with reference to FIG. 2A. However, instead of the automated package delivery system 140 requesting and receiving a decryption key 214 from the recipient 130 as in FIG. 2A, the automated package delivery system 140 can generate the decryption key 214, and can communicate the decryption key 214 to the recipient device 212b. The decryption key 214 can be generated in any suitable manner. In one embodiment, the automated package delivery system 140 can generate asymmetric keys, such that one key is sent to the recipient device 212b as the decryption key 214, and another key is sent to the sender device 112a as the encryption key 216. In another embodiment, the automated package delivery system 140 can generate a single key, such that the same key is sent to the recipient device 212b as the decryption key 214 and to the sender device 112a as the encryption key 216. In these and other embodiments, the encryption key 216 and the decryption key 214 can both be generated together, the encryption key 216 and the decryption key 214 can each be generated independently, the encryption key 216 can be generated from the decryption key 214, the decryption key 214 can be generated from the encryption key 216, etc. As described above, the automated package delivery system 140 can generate the keys in various ways, such as without relation to particulars of the package delivery transaction (e.g., based on a random key generator, a look up table, etc.), in relation to information about the package transaction (e.g., using timestamp, sender data, recipient data, unique package identifier, etc.), etc.

Figure 2C:
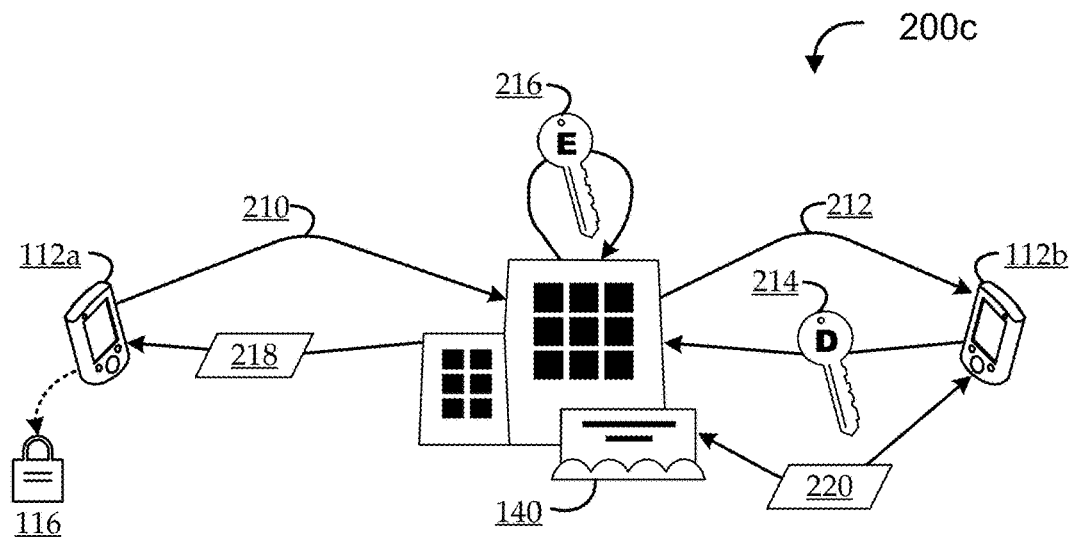

Turning to FIG. 2C, another illustrative flow 200c is shown. In general, the flow 200c can proceed in a similar manner to the flow 200a described above with reference to FIG. 2A. However, instead of the automated package delivery system 140 sending the encryption key 216 to the sender device 112a for use by the sender device 112a in generating the encrypted lock code 218; the automated package delivery system 140 can use the encryption key 216 to generate the encrypted lock code 218, and can communicate the encrypted lock code 218 to the sender device 112a. In such a flow 200c, the encryption key 216 does not get communicated at all. According to a variation of the flow 200c, the receipt of the decryption key 214 by the automated package delivery system 140 can occur sometime prior to the package delivery request 210. For example, when the sender device 112a registers with a package delivery service, the decryption key 214 can be communicated from the recipient device 212b to the automated package delivery system 140 (or, alternatively, from the automated package delivery system 140 to the recipient device 212b). In such a variation, neither the encryption key 216 nor the decryption key 214 needs to be communicated to either the sender device 112a or the recipient device 212b to carry out the physical package delivery.

Figure 2D:
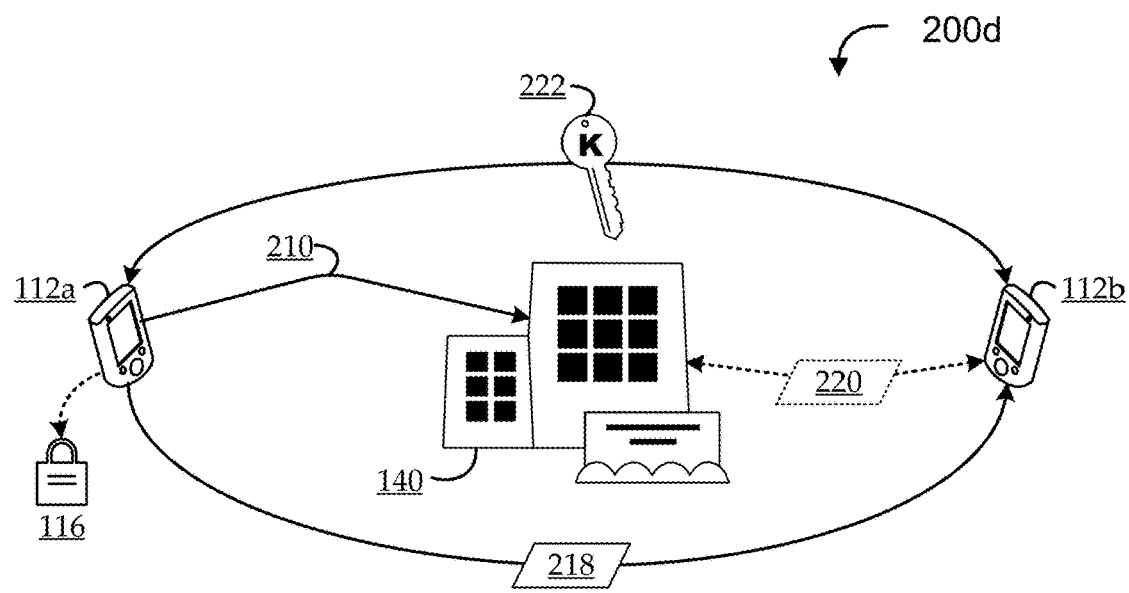

Turning to FIG. 2D, another illustrative flow 200d is shown. In general, the flow 200d can proceed in a similar manner to the flow 200a described above with reference to FIG. 2A, except that the automated package delivery system 140 is kept more removed from the key exchange. As illustrated, in association with the package delivery request 210, or at any other suitable time (e.g., prior to and/or subsequent to the package delivery request 210) one or more keys 222 can be communicated directly between the sender device 112a and the recipient device 212b. In some implementations, the key 222 is a symmetric key that can be used as both the encryption key 216 and the decryption key 214. For example, the exchange may be otherwise secured (e.g., by being communicated over a secure network link). In other implementations, a public-private key exchange is performed. In other implementations, the key exchange occurs in multiple pieces. For example, a shared portion of the key is exchanged when each adds the other to a list of contacts, and a second portion of the key is communicated in relation to the package delivery request 210, and the two pieces together form the key 222. As illustrated, in such a flow 200d, the encrypted lock code 218 may also be directly communicated from the sender device 112a to the recipient device 212b. Such an approach can effectively obfuscate all keys and codes from the automated package delivery system 140, if desired. Alternatively, the encrypted lock code 218 can be communicated via the automated package delivery system 140. In some embodiments, the recipient device 212b can still exchange certain information with the automated package delivery system 140 (e.g., communications 220). For example, the automated package delivery system 140 may still add further security measures, or may still request a confirmation of delivery, etc.

Though many variants are described above, all share various features, including that the sender 110 is able to lock the electronic lock 116 to secure the contents of the physical package 114 prior to sending the package to the distribution facility 135, the intended recipient 130 is able to unlock the electronic lock 116 after receiving the secured physical package 114, and unintended recipients are not able to unlock the electronic lock 116 if they should receive the secured physical package 114. Some of the variants described above provide even further security. For example, in some variants, the sender 110 can lock the electronic lock 116, but would have no way of unlocking the electronic lock 116 without assistance from the automated package delivery system 140 and/or the recipient 130; and in some variants, even the automated package delivery system 140 lacks the information needed to unlock the electronic lock 116. Further, application of different security measures by different parties can facilitate multiple levels of security. For example, the key exchange of encryption and decryption keys can help to ensure security by and between the sender 110 and recipient 130, with or without involving the distribution facility 135 in any way; and application by the distribution facility 135 of sensor tags, or the like, can help to ensure security between the distribution facility 135 and the recipient 130, with or without involving the sender 110 in any way. For example, a delivery drone or physical package drop box can restrict access to the physical package 114 until the recipient 130 has presented the sensor tag identifier, or information indicated by the sensor tag identifier (e.g., the sensor tag identifier can include biometric information, a passcode, etc.), and the presented information has been authenticated by the automated package delivery system 140. However, even after being able to physically retrieve the physical package 114, the recipient 130 may still be unable to unlock the electronic lock 116 and access the package contents without also using information involved with the key exchange. Similarly, such implementations can facilitate security environments in which, for example, recipients 130 have an ongoing security relationship with the distribution facility 135 and/or automated package delivery system 140 by which they can access a personal mailbox, retrieve packages from drones, authorize release of packages from delivery personnel, etc. (e.g., using pre-negotiated credentials, such as passcodes, biometrics, etc.); while still allowing each physical package 114 to be uniquely secured in accordance with a sender-recipient key exchange. Further, such implementations can operate even in contexts involving multiple parties that may have a logistical involvement in the package delivery, but may not have a security relationship with any of the parties. For example, the distribution facility 135 and the automated package delivery system 140 may be controlled by different entities, and the automated package delivery system 140 may be able to assist with end-to-end security measures, even though the distribution facility 135 has no access to, or awareness of, those measures.

Figure 3:
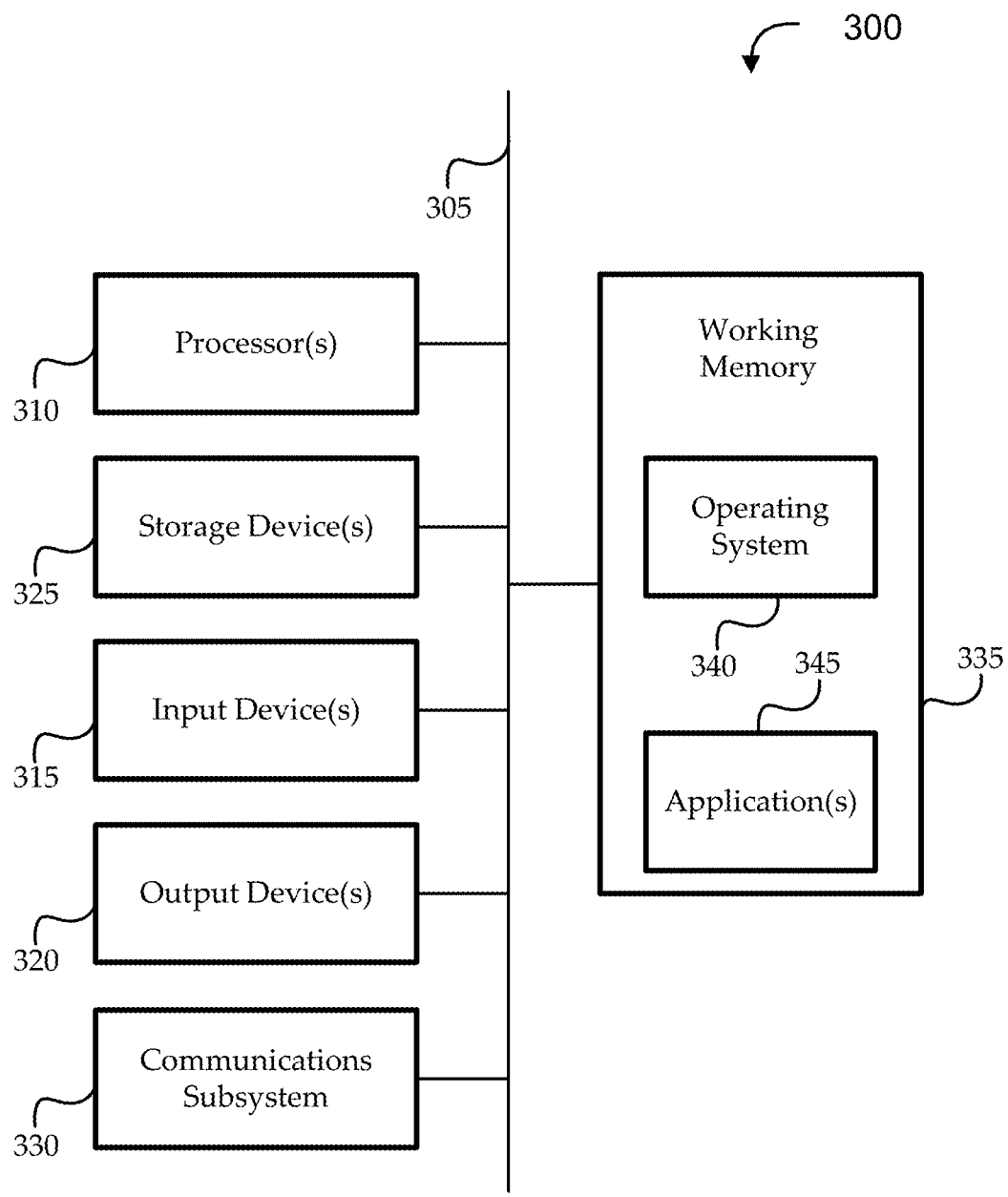
FIG. 3 provides a schematic illustration of one embodiment of a computer system that can perform various steps of the methods provided by various embodiments.

Embodiments of the automated package delivery system 140, or components thereof, can be implemented on, and/or can incorporate, one or more computer systems, as illustrated in FIG. 3. FIG. 3 provides a schematic illustration of one embodiment of a computer system 300 that can perform various steps of the methods provided by various embodiments. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown including hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, video decoders, and/or the like); one or more input devices 315, which can include, without limitation, a mouse, a keyboard, remote control, and/or the like; and one or more output devices 320, which can include, without limitation, a display device, a printer, and/or the like.

The computer system 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 300 can also include a communications subsystem 330, which can include, without limitation, a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 330 may permit data to be exchanged with a network (such as the various networks described herein), other computer systems, and/or any other devices described herein. In many embodiments, the computer system 300 will further include a working memory 335, which can include a RAM or ROM device, as described herein.

The computer system 300 also can include software elements, shown as currently being located within the working memory 335, including an operating system 340, device drivers, executable libraries, and/or other code, such as one or more application programs 345, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes can be stored on a non-transitory computer-readable storage medium, such as the non-transitory storage device(s) 325 described above. In some cases, the storage medium can be incorporated within a computer system, such as computer system 300. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 300 and/or can take the form of source and/or installable code, which, upon compilation and/or installation on the computer system 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which can be incorporated into the operating system 340 and/or other code, such as an application program 345) contained in the working memory 335. Such instructions may be read into the working memory 335 from another computer-readable medium, such as one or more of the non-transitory storage device(s) 325. Merely by way of example, execution of the sequences of instructions contained in the working memory 335 can cause the processor(s) 310 to perform one or more procedures of the methods described herein.

In some embodiments, the computer system 300 implements an automated package delivery system, as described herein, in accordance with instructions stored in working memory 335 and executable by the processor(s) 310. In some such embodiments, the input devices 315, output devices 320, and communications subsystem 330 can be configured to implement a scanner interface to receive scan data from one or more scanners (e.g., over an Internet of Things (IoT) network), a network interface to communicatively couple with one or more communications networks, and/or other components of systems described herein. The instructions stored in working memory 335 can, when executed by the one or more processors 310, cause the one or more processors 310 to receive scan data from a scanner via the scanner interface responsive to scanning a physical package to obtain a unique package identifier from the physical package, the unique package identifier associated with delivery information and with an encryption key, the delivery information indicating a physical recipient destination and a logical recipient destination, the physical package received at a distribution facility from a sender remote from the distribution facility, the physical package having the unique package identifier and having contents secured by an electronic lock that is locked by the sender using a lock code encrypted by the encryption key to generate an encrypted lock code, the encryption key generated in accordance with a decryption key of a recipient of the physical package, such that the decryption key is usable to decrypt the encrypted lock code to unlock the electronic lock. The instructions can further cause the one or more processors 310 to: obtain the delivery information and the encrypted lock code automatically in response to receiving the scan data and in accordance with the unique package identifier; direct physical routing of the physical package from the distribution facility to the physical recipient destination; and communicate the encrypted lock code to the logical recipient destination over the one or more communications networks via the network interface.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 300, various computer-readable media can be involved in providing instructions/code to processor(s) 310 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 325. Volatile media include, without limitation, dynamic memory, such as the working memory 335.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 310 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 300.

The communications subsystem 330 (and/or components thereof) generally will receive signals, and the bus 305 then can carry the signals (and/or the data, instructions, etc., carried by the signals) to the working memory 335, from which the processor(s) 310 retrieves and executes the instructions. The instructions received by the working memory 335 may optionally be stored on a non-transitory storage device 325 either before or after execution by the processor(s) 310.

It should further be understood that the components of computer system 300 can be distributed across a network. For example, some processing may be performed in one location using a first processor while other processing may be performed by another processor remote from the first processor. Other components of computer system 300 may be similarly distributed. As such, computer system 300 may be interpreted as a distributed computing system that performs processing in multiple locations. In some instances, computer system 300 may be interpreted as a single computing device, such as a distinct laptop, desktop computer, or the like, depending on the context.

Figure 4:
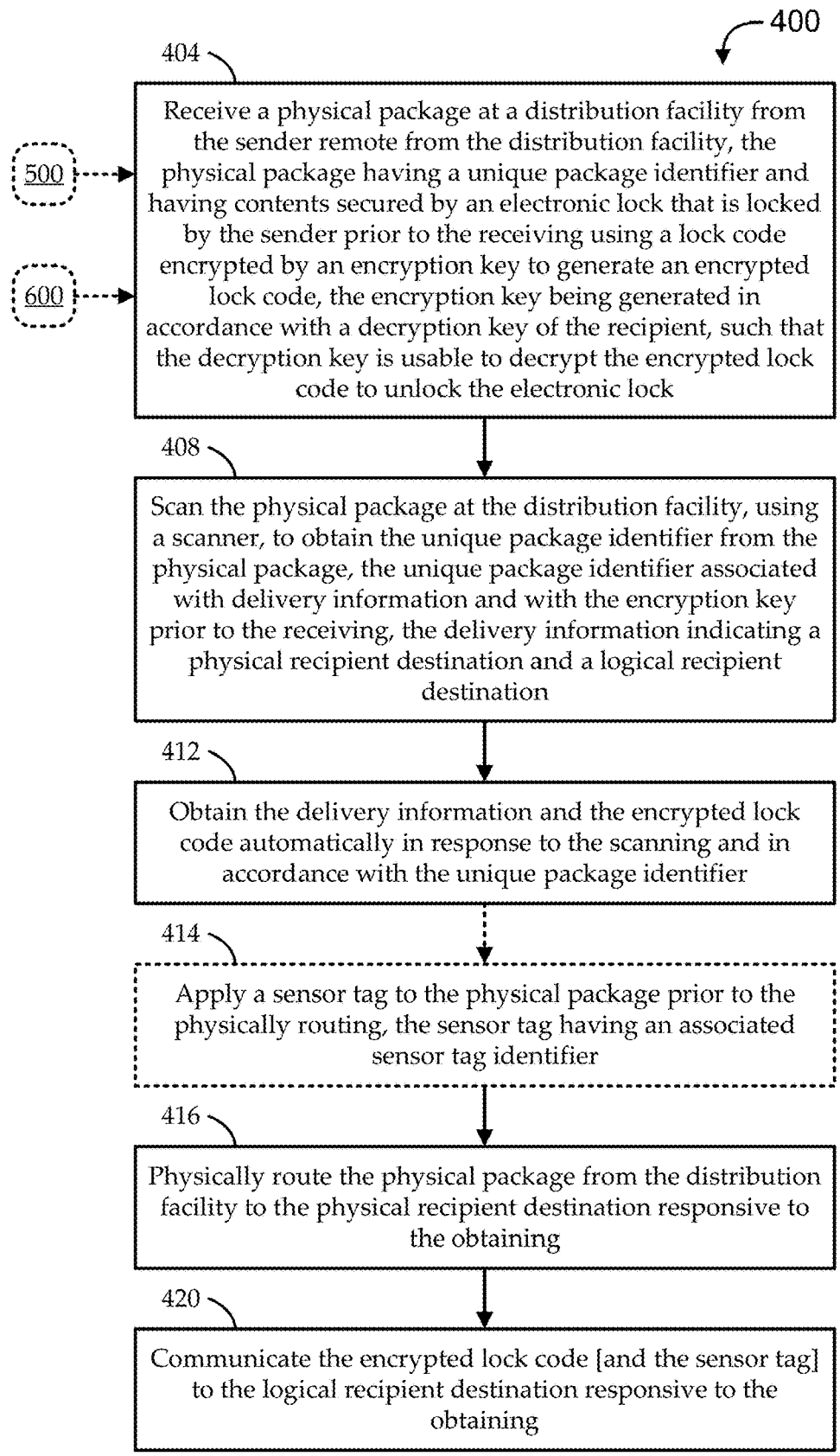
FIG. 4 shows a flow diagram of an illustrative method for physical package delivery from a sender to a recipient with end-to-end security, according to various embodiments.

Systems including those described above can be used to implement various methods. FIG. 4 shows a flow diagram of an illustrative method 400 for physical package delivery from a sender to a recipient with end-to-end security, according to various embodiments. Embodiments of the method 400 begin at stage 404 by receiving a physical package at a distribution facility from the sender remote from the distribution facility. The physical package can have a unique package identifier, and the physical package can also have contents secured by an electronic lock. The electronic lock can be locked by the sender prior to the receiving at stage 404 using a lock code. The lock code can be encrypted by an encryption key to generate an encrypted lock code. The encryption key can be generated in accordance with a decryption key of the recipient, such that the decryption key is usable to decrypt the encrypted lock code to unlock the electronic lock (e.g., when the physical package is received by the recipient).

At stage 408, embodiments can scan the physical package at the distribution facility. The scanning at stage 408 can be performed using a scanner to obtain the unique package identifier from the physical package. In some embodiments, the unique package identifier is uniquely associated with the electronic lock (e.g., applied to the lock, integrated with the lock, etc.), and the scanning at stage 408 involves scanning the electronic lock using the scanner to obtain the unique package identifier. In other embodiments, the unique package identifier is uniquely associated with a label of the physical package (e.g., applied to the physical package, integrated with the physical package, etc.), and the scanning at stage 408 involves scanning the label to obtain the unique package identifier. The unique package identifier can be associated with delivery information and with the encryption key prior to the receiving. For example, the sender can have transmitted information to the distribution facility that includes the unique package identifier and the delivery information, and, in some cases, the encryption key and/or the encrypted lock code. The delivery information can indicate a physical recipient destination (e.g., a street address) and a logical recipient destination (e.g., a logical identifier of the recipient in a database; a network identifier or locator for a device or application of the recipient; a phone number, email address, or other communication identifier; etc.).

At stage 412, embodiments can obtain the delivery information and the encrypted lock code automatically in response to the scanning and in accordance with the unique package identifier. For example, the scanner can be in communication with a database via a local network (e.g., an IoT network, or any other suitable network). The scanner can be used (e.g., by a human or automated operator) to scan the physical package to obtain the unique package identifier (e.g., from a package label, a bar code, a QR code, an RFID tag, a magnetic or optical signature, etc.). The scanner can then communicate over the local network with the database to obtain the delivery information and the encrypted lock code stored in association with the unique package identifier.

At stage 416, embodiments can physically route the physical package from the distribution facility to the physical recipient destination responsive to the obtaining at stage 412. The physical routing can involve scheduling and/or directing any suitable delivery vehicle, including a manual vehicle (e.g., a human-operated delivery truck), a fully autonomous delivery vehicle (e.g., a drone, an autonomous delivery van, etc.), a partially automated vehicle, and/or multiple such vehicles. For example, the physical routing can involve scheduling delivery of the package by an autonomous fork lift to loading dock, where the package is transported by a human-operated delivery van to an airfield, where the package is picked up by an autonomous drone than flies the package to the physical recipient destination.

At stage 420, embodiments can communicate the encrypted lock code to the logical recipient destination responsive to the obtaining. For example, the recipient (e.g., an application running on a device of the recipient) is aware of a decryption code. When the recipient receives the encrypted lock code, the recipient's application can apply the decryption key to the encrypted lock code to recover an unlock code (which may or may not be the same as the lock code used by the sender to lock the electronic lock). The receiver can use the unlock code to unlock the electric lock on the physical package and to access the contents of the physical package. In some embodiments, the lock code is pushed directly from a server (e.g., of the distribution facility) to the application of the recipient. In other embodiments, communicating the encrypted lock code to the logical recipient destination at stage 420 can involve: communicating the encrypted lock code to a storage device that is accessible to an application of the recipient over a communications network; receiving a request for the encrypted lock code from the application of the recipient over the communications network; authenticating the request as associated with an authorized recipient of the physical package; and communicating the encrypted lock code to the application of the recipient over the communications network responsive to the request and responsive to the authenticating.

In some embodiments, the distribution facility can apply one or more additional identifiers to the physical package for added security, or to facilitate additional features, prior to physically routing the physical package at stage 416. As illustrated, embodiments of the method 400 can further include applying a sensor tag to the physical package at stage 414. The sensor tag can be an RFID tag, a barcode, a QR code, a magnetic tag, an optical tag, and/or any other suitable tag to apply an associated sensor tag identifier to the physical package. The sensor tag identifier can be generated independent of other information relating to the physical package, or in accordance with (e.g., as a function of) other information relating to the physical package. For example, the sensor tag identifier can be generated as a function of the type of package, sender and/or recipient information, etc. In such embodiments, the communicating at stage 420 can include communicating the sensor tag to the logical recipient destination. In some such embodiments, the physically routing at stage 416 can include physically releasing the physical package at the physical recipient destination only in response to authentication of a recipient in accordance with presentation of the sensor identifier by the recipient and matching of the sensor identifier to the sensor tag. For example, a drone or physical package drop box can restrict access to the physical package until the recipient has presented the sensor tag identifier, or information indicated by the sensor tag identifier (e.g., the sensor tag identifier can include biometric information, a passcode, etc.).

Figure 5:
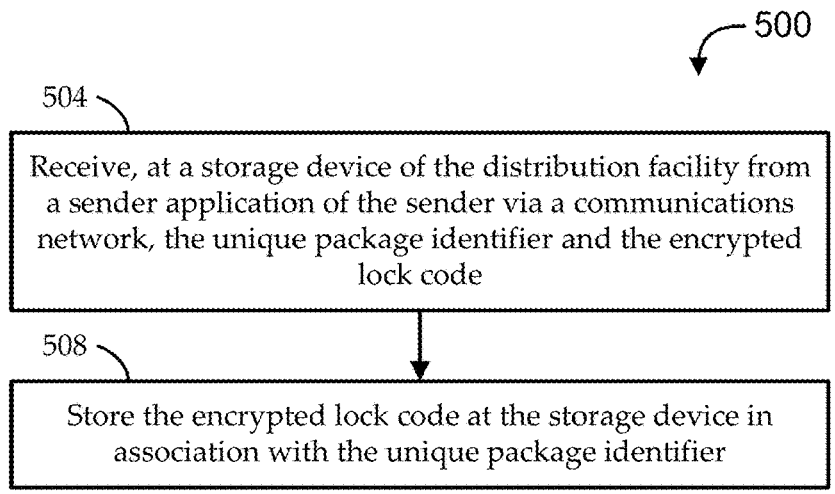
FIG. 5 shows a method 500 for pre-storing certain information at the distribution facility, according to some embodiments.

Various embodiments of the method 400 include additional features. For example, some embodiments of the method 400 begin in accordance with method 500 of FIG. 5, and other embodiments of the method 400 begin in accordance with method 600 of FIG. 6. Turning to FIG. 5, a method 500 is shown for pre-storing certain information at the distribution facility, according to some embodiments. The method 500 can begin at stage 504 by receiving, at a storage device of the distribution facility from a sender application of the sender via a communications network, the unique package identifier and the encrypted lock code. At stage 508, embodiments can store the encrypted lock code at the storage device in association with the unique package identifier. For example, the storage device can include a relational database, or any other suitable data structure, for storing the encrypted lock code in association with the unique package identifier. As described above, some embodiments of method 400 of FIG. 4 begin in accordance with the method 500 of FIG. 5. In such embodiments, obtaining the encrypted lock code automatically in response to the scanning and in accordance with the unique package identifier at stage 412 can include retrieving the encrypted lock code from the storage device automatically in accordance with the unique package identifier.

Figure 6:
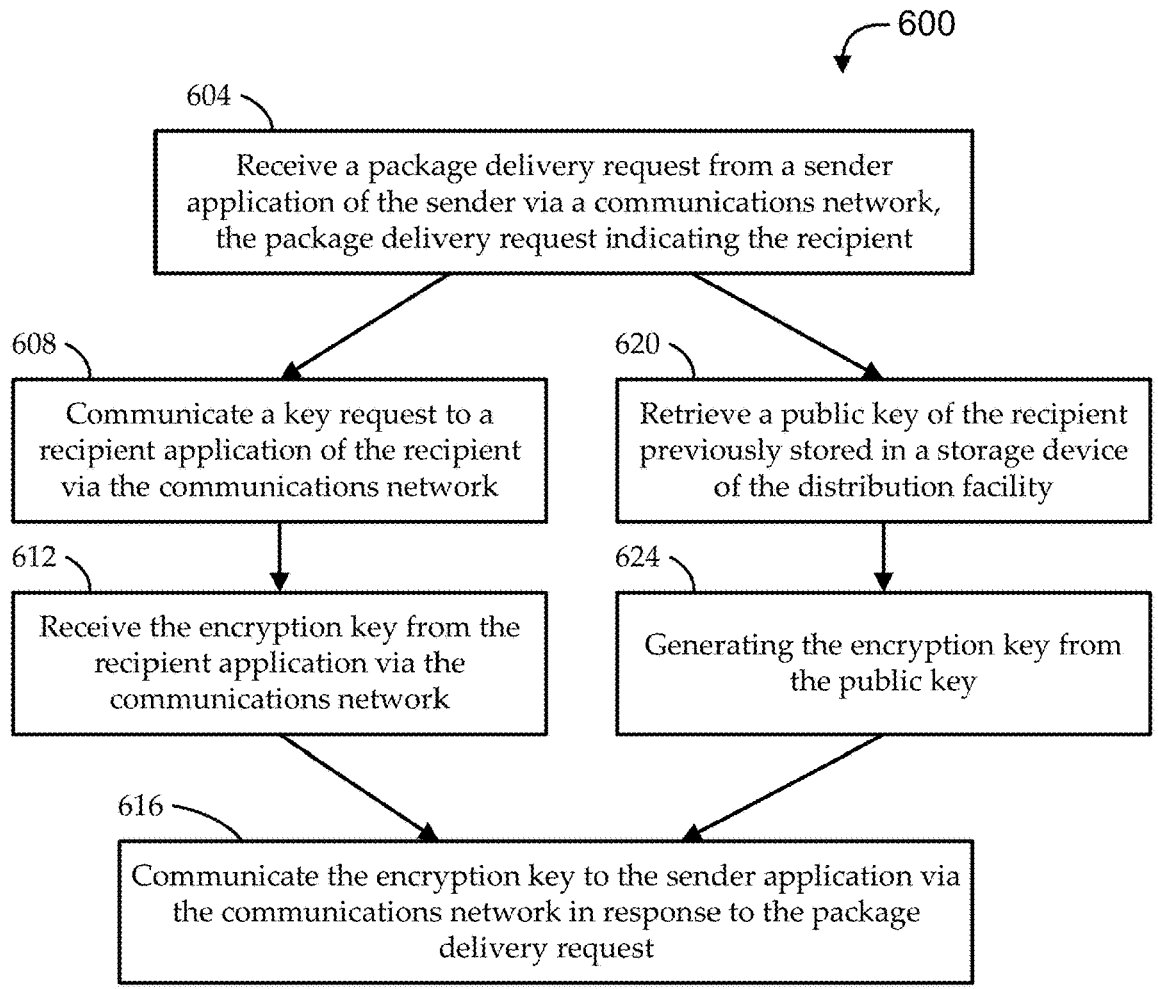
FIG. 6 shows a method 600 for various illustrative key exchange implementations, according to some embodiments.

Turning to FIG. 6, a method 600 is shown for various illustrative key exchange implementations, according to some embodiments. Embodiments of the method 600 begin at stage 604 by receiving a package delivery request from a sender application of the sender via a communications network. The package delivery request indicates the recipient (e.g., by name and/or by any other suitable identifier). According to the first set of embodiments, the method 600 can continue by communicating a key request to a recipient application of the recipient via the communications network at stage 608. At stage 612, embodiments can receive the encryption key from the recipient application via the communications network in response to the key request. In some such embodiments, the encryption key is computed as a function of the decryption key of the recipient, such that the encryption key is a public key, the decryption key is a private key, and the encryption key and the decryption key are asymmetric keys. In other such embodiments, the encryption key is computed as a function of the decryption key of the recipient, such that the encryption key and the decryption key are symmetric keys. At stage 416, embodiments can communicate the encryption key to the sender application via the communications network in response to the package delivery request. According to a second set of embodiments, the method 600 can continue at stage 620 by retrieving a public key of the recipient previously stored in a storage device of the distribution facility. At stage 624, embodiments can generate the encryption key from the public key. As in the first set of embodiments, at stage 416, embodiments can communicate the encryption key to the sender application via the communications network in response to the package delivery request. As described above, some embodiments of method 400 of FIG. 4 begin in accordance with the method 600 of FIG. 6. In such embodiments, the encryption key communicated to the sender at stage 616 can be used by the sender to encrypt the lock code, thereby generating the encrypted lock code prior to sending the physical package to the distribution facility.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for automated package delivery with end-to-end package security, the method comprising:
   delivering a physical package autonomously to a recipient at a physical recipient destination by an autonomous package delivery vehicle in accordance with direction by a drone controller at a distribution facility remote from both a sender location and the physical recipient destination,
      wherein the physical package has a unique package identifier associated, by a sender, with delivery information indicating the physical recipient destination and a logical recipient destination,
      wherein the physical package has contents secured by an electronic lock that is locked by the sender using a lock code encrypted by an encryption key to generate the encrypted lock code, the encryption key generated in accordance with a decryption key of the recipient of the physical package, such that the decryption key is usable to decrypt the encrypted lock code to unlock the electronic lock,
      wherein physical access by the recipient to the physical package is restricted by the autonomous package delivery vehicle when delivered;
   authenticating the recipient at the physical recipient destination, based on identifying information provided by a recipient device associated with the logical recipient destination, the identifying information being separate from the lock code and the decryption key, and having been stored in association with the unique package identifier at the distribution facility; and
   physically releasing the physical package to the recipient responsive to successfully completing the authenticating.

2. The method of claim 1, wherein:
   the authenticating is based on matching the identifying information as provided by the recipient device with sensor tag information electronically read by the autonomous package delivery vehicle,
   the physical package having been associated at the distribution facility with a sensor tag associated with the sensor tag information, at least a portion of the sensor tag information obtainable by the autonomous package delivery vehicle by electronically reading the sensor tag.

3. The method of claim 2, wherein:
   the sensor tag information indicates a biometric identifier of an intended recipient and/or a passcode of the intended recipient, the intended recipient designated by the delivery information; and
   the matching comprises determining whether the identifying information comprises the biometric identifier an intended recipient and/or the passcode of the intended recipient.

4. The method of claim 2, wherein:
   the sensor tag information comprises a sensor tag identifier encoded on the sensor tag, and stored sensor tag information that is stored at the distribution facility in association with the sensor tag identifier;
   the electronically reading comprises obtaining the sensor tag identifier from the sensor tag by the autonomous package delivery vehicle and transmitting the sensor tag identifier from the autonomous package delivery vehicle to the distribution facility; and
   the authenticating comprises:
      obtaining at least some of the stored sensor tag information at the distribution facility responsive to receiving the sensor tag identifier from the autonomous package delivery vehicle;
      matching the obtained stored sensor tag information with the identifying information at the distribution facility as received from the recipient device; and
      communicating an authentication message to the autonomous package delivery vehicle indicating authentication of the recipient.

5. The method of claim 1, wherein:
   the authenticating is further based on receiving the lock code as recovered at the recipient device by applying the decryption key to the encrypted lock code received by the recipient device from the distribution facility, such that the physically releasing comprises physically releasing the physical package by the autonomous package delivery vehicle to the recipient with the electronic lock in an unlocked state responsive to the authenticating.

6. The method of claim 1, wherein:
the physically releasing comprises physical package by the autonomous package delivery vehicle to the recipient with the electronic lock in a locked state responsive to the authentication,
such that the contents of the released physical package are accessible to the recipient only after recovering the lock code by using the recipient device to apply the decryption key to the encrypted lock code received by the recipient device from the distribution facility, and using the lock code to unlock the electronic lock.

7. The method of claim 1, further comprising:
directing, by the drone controller at the distribution facility, the physical delivery of the physical package to the recipient at the recipient destination using the autonomous package delivery vehicle.

8. The method of claim 7, further comprising:
receiving the physical package at the distribution facility from the sender with the contents secured by the electronic lock;
scanning the physical package at the distribution facility to obtain the unique package identifier from the physical package, the unique package identifier associated with delivery information and with the encrypted lock code prior to the receiving;
obtaining the delivery information and the encrypted lock code automatically in response to the scanning and in accordance with the unique package identifier; and
communicating the encrypted lock code to the logical recipient destination responsive to the obtaining,
wherein the directing the physical delivery of the physical package is responsive to and in accordance with the obtaining.

9. The method of claim 1, wherein the autonomous package delivery vehicle is a fully autonomous vehicle.

10. An automated package delivery system with end-to-end package security, the system comprising:
an autonomous package delivery vehicle in wireless communication with, and under control of, a drone controller at a distribution facility remote from both a sender location and a recipient destination, the autonomous package delivery vehicle adapted to:
deliver a physical package autonomously to a recipient at a physical recipient destination as directed by the drone controller,
wherein the physical package has a unique package identifier associated, by a sender, with delivery information indicating a physical recipient destination and a logical recipient destination,
wherein the physical package has contents secured by an electronic lock that is locked by the sender using a lock code encrypted by an encryption key to generate the encrypted lock code, the encryption key generated in accordance with a decryption key of a recipient of the physical package, such that the decryption key is usable to decrypt the encrypted lock code to unlock the electronic lock;
restrict physical access by the recipient to the physical package prior to authentication of the recipient based on identifying information provided by a recipient device associated with the logical recipient destination, the identifying information being separate from the lock code and the decryption key, and having been stored in association with the unique package identifier at the distribution facility; and
physically release the physical package to the recipient responsive to the authentication.

11. The automated package delivery system of claim 10, further comprising:
the drone controller to direct operation of a plurality of autonomous package delivery vehicles adapted for delivery of physical packages, the autonomous package delivery vehicle being one of the plurality of autonomous package delivery vehicles.

12. The automated package delivery system of claim 11, further comprising:
a package tracking processor coupled with the drone controller to direct dispatching of the plurality of autonomous package delivery vehicles.

13. The automated package delivery system of claim 10, wherein:
the physical package is associated at the distribution facility with a sensor tag having associated sensor tag information, at least a portion of the sensor tag information obtainable by the autonomous package delivery vehicle by electronically reading the sensor tag; and
the authentication of the recipient based on matching the identifying information as provided by the recipient device with the sensor tag information as electronically read by the autonomous package delivery vehicle.

14. The automated package delivery system of claim 13, wherein:
the sensor tag information indicates a biometric identifier of an intended recipient and/or a passcode of the intended recipient, the intended recipient designated by the delivery information; and
the matching comprises determining whether the identifying information comprises the biometric identifier an intended recipient and/or the passcode of the intended recipient.

15. The automated package delivery system of claim 13, wherein:
the sensor tag information comprises a sensor tag identifier encoded on the sensor tag, and stored sensor tag information that is stored at the distribution facility in association with the sensor tag identifier;
the electronically reading comprises obtaining the sensor tag identifier from the sensor tag by the autonomous package delivery vehicle and transmitting the sensor tag identifier from the autonomous package delivery vehicle to the distribution facility; and
the authentication of the recipient comprises:
obtaining at least some of the stored sensor tag information at the distribution facility responsive to receiving the sensor tag identifier from the autonomous package delivery vehicle;
matching the obtained stored sensor tag information with the identifying information at the distribution facility as received from the recipient device; and
communicating an authentication message to the autonomous package delivery vehicle indicating authentication of the recipient.

16. The automated package delivery system of claim 10, wherein:
the authentication of the recipient is further based on receiving the lock code as recovered at the recipient device by applying the decryption key to the encrypted lock code received by the recipient device from the distribution facility,
such that the autonomous package delivery vehicle is adapted to physically release the physical package to the recipient with the electronic lock in an unlocked state responsive to the authentication.

17. The automated package delivery system of claim 10, wherein:
- the autonomous package delivery vehicle is adapted to physically release the physical package to the recipient with the electronic lock in a locked state responsive to the authentication,
- such that the contents of the released physical package are accessible to the recipient only after recovering the lock code by using the recipient device to apply the decryption key to the encrypted lock code received by the recipient device from the distribution facility, and using the lock code to unlock the electronic lock.

18. The automated package delivery system of claim 10, further comprising:
- the physical package having structural features adapted to physically interface with structural features of the autonomous package delivery vehicle to support restricting access by the autonomous package delivery vehicle to the physical package prior to the authentication and to support releasing of the physical package to the recipient responsive to the authentication.

19. The automated package delivery system of claim 10, wherein the autonomous package delivery vehicle is a flying drone.

20. The automated package delivery system of claim 10, wherein the autonomous package delivery vehicle is a fully autonomous vehicle.

* * * * *